UNITED STATES PATENT OFFICE.

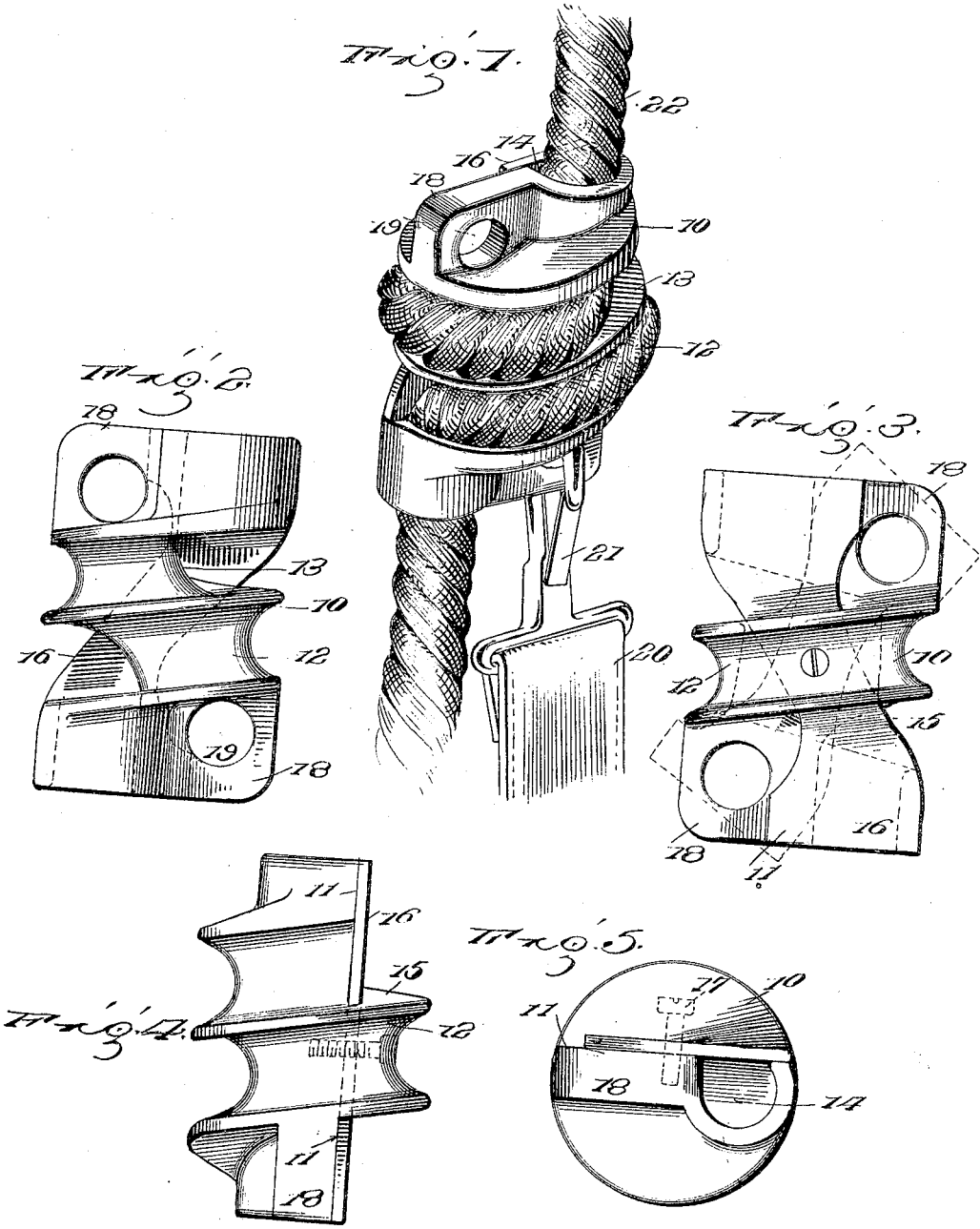

ANDREW F. V. STENBORG, OF HIBBING, MINNESOTA.

FIRE-ESCAPE.

1,103,849.     Specification of Letters Patent.     Patented July 14, 1914.

Application filed September 25, 1912. Serial No. 722,338.

*To all whom it may concern:*

Be it known that I, ANDREW F. V. STENBORG, a subject of the King of Sweden, residing at Hibbing, in the county of St. Louis and State of Minnesota, have invented certain new and useful Improvements in Fire-Escapes, of which the following is a specification.

My invention relates to new and useful improvements in fire escapes and more particularly to that type in which the escape is made by means of a rope or cable, the safe descent upon the rope or cable being accomplished by means of a brake or cable gripping member movable along the rope or cable and governed in its movement by the amount of strain exerted on the rope or cable below the brake, a life belt being fastened to the brake for the support of the person using the fire escape.

The primary object of my invention is to provide an improved form of brake which may be readily attached to or removed from the cable or rope.

A further object of my invention is to provide a brake or cable gripping member of the tortuous rope passage type which, because of the peculiar formation of the rope or cable passage, will, in proportion to its size, especially length, exert a strong gripping action upon the cable or rope.

A further object of my invention is to so construct the brake, and its passage that the rope or cable may be readily applied and without the necessity of threading the rope or cable through any closed passage. And a still further object of my invention is to provide means for locking the rope or cable when applied to the brake from disengagement therefrom.

With these and other objects in view, my invention will be more fully described, illustrated in the accompanying drawings, and then specifically pointed out in the claims which are attached to and form a part of this application.

In the drawings: Figure 1 is a perspective view of my improved rope or cable brake in use; Fig. 2 is an elevation of the same; Fig. 3 is a view of that side of the device opposite 3 is a view of that side of the device opposite to that shown in Fig. 2, showing the locking plate in its active position in full lines and in its inactive position in dotted lines; Fig. 4 is a view at right angles to that of Fig. 3; Fig. 5 is a top plan view of the same.

Corresponding and like parts are referred to in the following description and indicated in all the views of the drawings by the same reference characters.

The preferred embodiment of my invention includes a brake or gripping member including a body member of metal preferably cast or otherwise formed in a single piece and having a tortuous rope or cable receiving groove or passage and a locking member carried by the friction member and movable into active position to lock the rope or cable in said groove or passage.

In the figures the body member is designated as a whole by the numeral 10 and is substantially cylindrical in shape having its end portions flattened at one side, as shown at 11. The central portion of this body member is provided with a helical groove or rope receiving passage 12, the central portion of which is formed in that portion of the body between the flattened portions 11 and the ends of which terminate at the opposite side of the body member, the groove preferably extending about the member but once. The pitch of this groove is relatively short and its depth preferably less than the thickness of the rope or cable with which it is to be employed.

The ends of the groove are oppositely extended through the flattened faces at the ends of the block as shown at 13 and said extended portions are deepened in such a manner that their inner portions are nearly tangent to the axis of the body member. The end portions of the body member are provided with longitudinally extending grooves 14 communicating with the extended ends 13 and greater in depth than the thickness of the rope or cable. These grooves 14, as shown, are formed in the flattened end portions of the body member and at diagonally opposite sides thereof and form in effect continuations of the groove 12 and its extensions 13.

The rope or cable, when in place, seats in the groove 12 and extends in either direction in the extensions 13 and grooves 14. The faces of the grooves 12, 13 and 14 are all rounded or shaped to conform closely to the rope or cable and merge gradually into each other to form a smooth, uninterrupted bearing for the rope or cable.

It might be well to note at this point that the rope or cable enters the body member at one side of one end and leaves it at the opposite side of the other end, the intermediate portion of the rope or cable passing through a helical groove which, because of the deepening of its ends, is to all intents and purposes formed about a cylinder, the axis of which is at an angle to the axis of the body member as shown in Fig. 2.

When the rope or cable is tightened through the body member, the gripping action exerted upon the rope or cable thereby is not only that, due to the passage of the rope or cable through a helical groove, but also to the general direction taken by the rope or cable irrespective of this caused by the inclined axis of the central portion of the body member. The gripping action is thereby greatly increased and the brake may therefore be smaller and the groove shorter than has heretofore been found necessary.

In order to prevent the accidental displacement of the rope or cable from the groove I have provided a locking member so mounted on the body member that it may be moved over the open faces of the grooves 14. To accomplish this, I provide that portion of the body member between its flattened faces, with a centrally formed longitudinally extending slot 15 and a lock plate 16, preferably of metal, has its central portion positioned in this slot and is swingingly mounted therein by a screw or pivot pin 17, the head of which is countersunk in the inner face of the groove 12 to prevent any catching of the rope or cable thereon. This plate is so proportioned that in active position its end portions extend over the open sides of the grooves 14 to hold the rope or cable in place, the ends of the plate lying flush with the ends of the body member. In reverse position, the plate bears over the opposite side portions of the flattened faces 11 leaving the grooves unobstructed for the application of the rope or cable.

The ungrooved portions of the ends of the body member have their opposite faces also flattened, as shown, to provide diagonally located ears 18 perforated, as at 19. The life belt, a portion of which is shown at 20, is provided with a snap hook 21 for engagement through one of these ears and as will readily be seen when this hook is in place, the plate 16 is locked in active position.

From the foregoing description, taken in connection with the drawings, the operation of my device will be readily understood.

The device is applied to the rope or cable, designated by the numeral 22, by winding the rope or cable about the body member to seat it in the grooves, after which the lock plate 16 is swung to active position and the belt attached by its hook locking the plate against movement.

The apparatus is preferably furnished complete with the brake mounted on the rope or cable and the belt attached thereto and is installed in the building merely by attaching that end of the rope or cable opposite the belt carrying end of the block to a ring or other suitable device fixed in the building near the window. The rope or cable of course should be long enough so that its free end, when extended, will reach the ground.

The person using the device fastens the belt about his body below the arms, drops the free end of the rope or cable from the window and lowers himself at any desired speed, the speed at which he descends being governed by his grip upon the rope or cable below the brake. Because of the brake construction, this strain is very slight and the weakest person can safely escape. A person in a faint or otherwise incapacitated when once in the belt may be safely lowered to the ground, the speed of descent being governed by a person standing below and drawing on the rope or cable.

This brake or rope gripper may of course be used as a means of lowering goods of all sorts and I do not therefore wish to limit it to its use as a fire escape.

Having thus described the invention, what is claimed as new is:—

1. A device of the character described including a body member provided with an encircling helical rope or cable receiving groove, the ends of which are extended longitudinally through the ends of the body, and a lock plate pivoted intermediate its length to the body member and adapted in one position to extend by its ends over the end portions of the groove to close the same.

2. A device of the character described including a tortuously grooved body member, a rope or cable adapted to engage in the groove of the body member, a locking member carried by the body member and movable into position to lock the rope or cable in the groove, a life belt, and means for attaching the life belt to the body member, said means also locking the locking member against movement out of active position.

3. A device of the character described including a body member, the central portion of which is provided with a helical rope or cable receiving groove and the end portions of which are flattened at one side, the flattened faces of said body member being grooved longitudinally to form continuations of the first mentioned groove, and a locking plate movable to snugly engage over the flattened portions of the body member to bear over the grooves thereof and prevent displacement of a cable therefrom.

4. A device of the character described including a body member, the end portions at one side of which are flattened, said body member being provided centrally with a helical rope or cable receiving groove, said flattened portions being provided with longitudinally extending rope or cable receiving grooves forming continuations of the helical groove, the central portion of the body member being provided with a longitudinal slot lying in the plane of the flattened end portions, a locking plate passed through said slot and pivoted therein, and supporting means detachably connected to said body member, the connection being such as to prevent movement of the locking plate to inactive position.

5. A device of the character described including a body member, the end portions at one side of which are flattened, said body member being provided centrally with a helical rope or cable receiving groove, said flattened portion being provided with longitudinally extending rope or cable receiving grooves forming continuations of the helical groove, the central portion of the body member being provided with a longitudinal slot lying in the plane of the flattened end portions, and a locking plate passed through said slot and pivoted therein.

6. A device of the character described including a body member having a helical rope or cable receiving groove in its face, a cable having its intermediate portion seated in said groove with its ends extending from diagonally opposite sides of the body member whereby one end portion forms a supporting cable and the opposite end portion a controlling cable, and a life belt secured to the body member at one side and in alinement with the supporting portion of the cable.

In testimony whereof I affix my signature in presence of two witnesses.

ANDREW F. V. STENBORG. [L. S.]

Witnesses:
G. V DAHLNER,
G. A. BERGGREN.

---

Copies of this patent may be obtained for five cents each, by addressing the "Commissioner of Patents, Washington, D. C."